Figure 1:
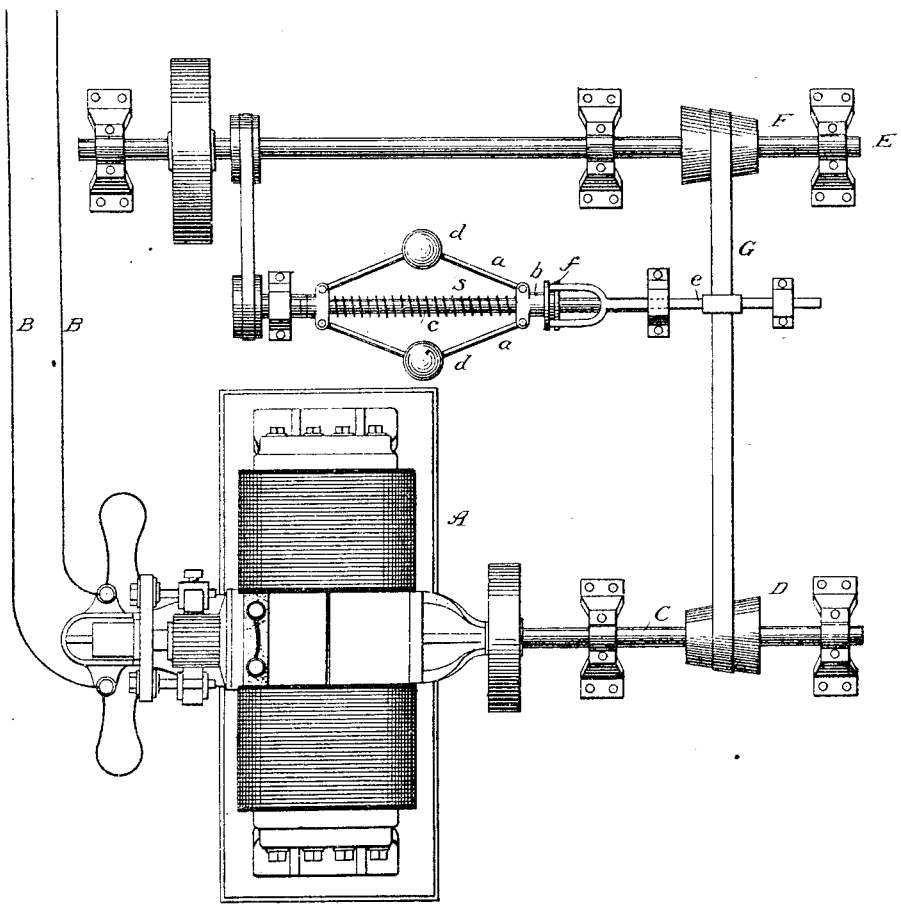

(No Model.) 3 Sheets—Sheet 1.

E. WESTON.
DEVICE FOR REGULATING THE ELECTRICAL TRANSMISSION OF POWER.

No. 272,364. Patented Feb. 13, 1883.

Attest:
Raymond F. Barnes.
Henry A. Beckmeyer.

Inventor:
Edward Weston
By Parker W. Page
atty.

(No Model.) 3 Sheets—Sheet 2.
E. WESTON.
DEVICE FOR REGULATING THE ELECTRICAL TRANSMISSION OF POWER.
No. 272,364. Patented Feb. 13, 1883.
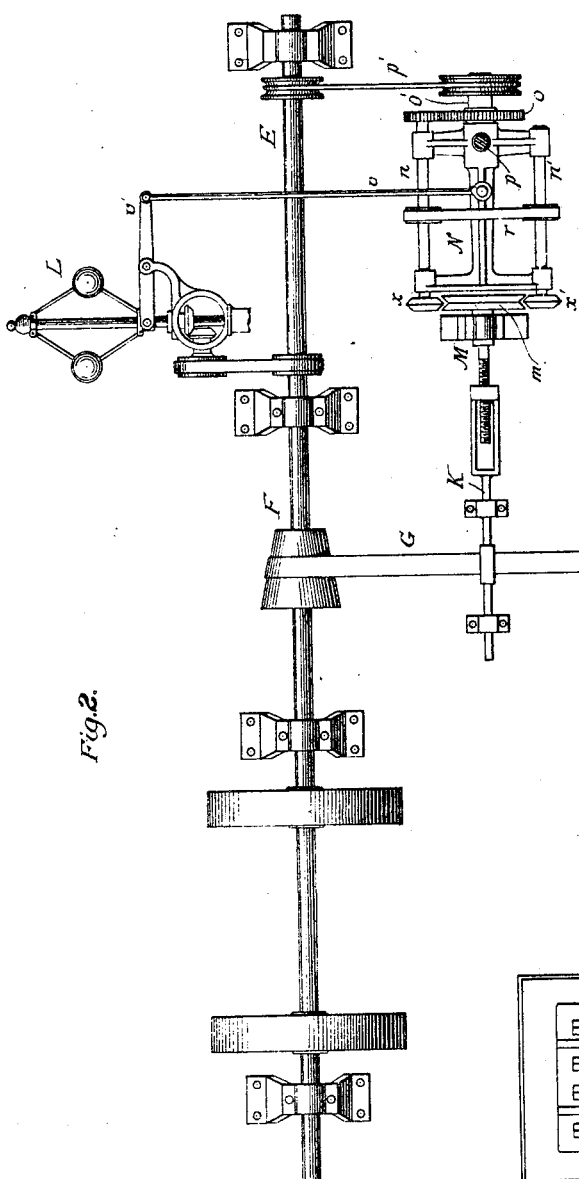
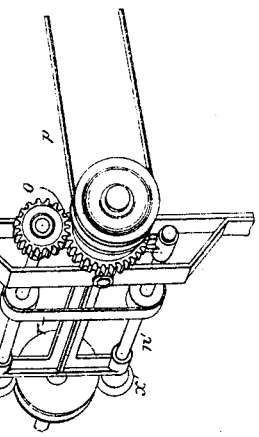
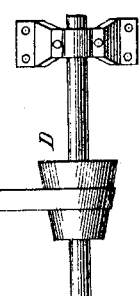
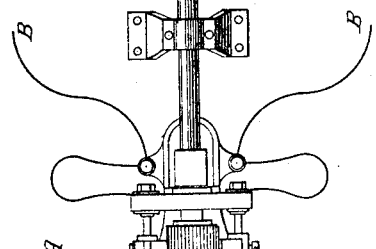
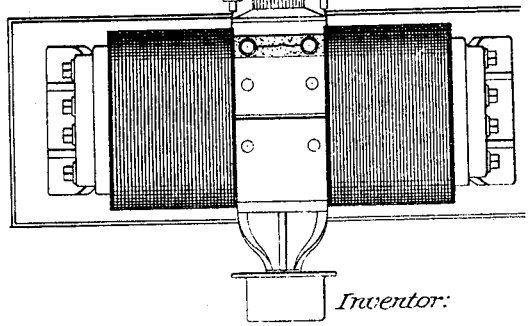
Attest:
Raymond F. Barnes.
Henry H. Beckmeyer.
Inventor:
Edward Weston
By Parker W. Page
atty.
N. PETERS. Photo-Lithographer, Washington, D. C.

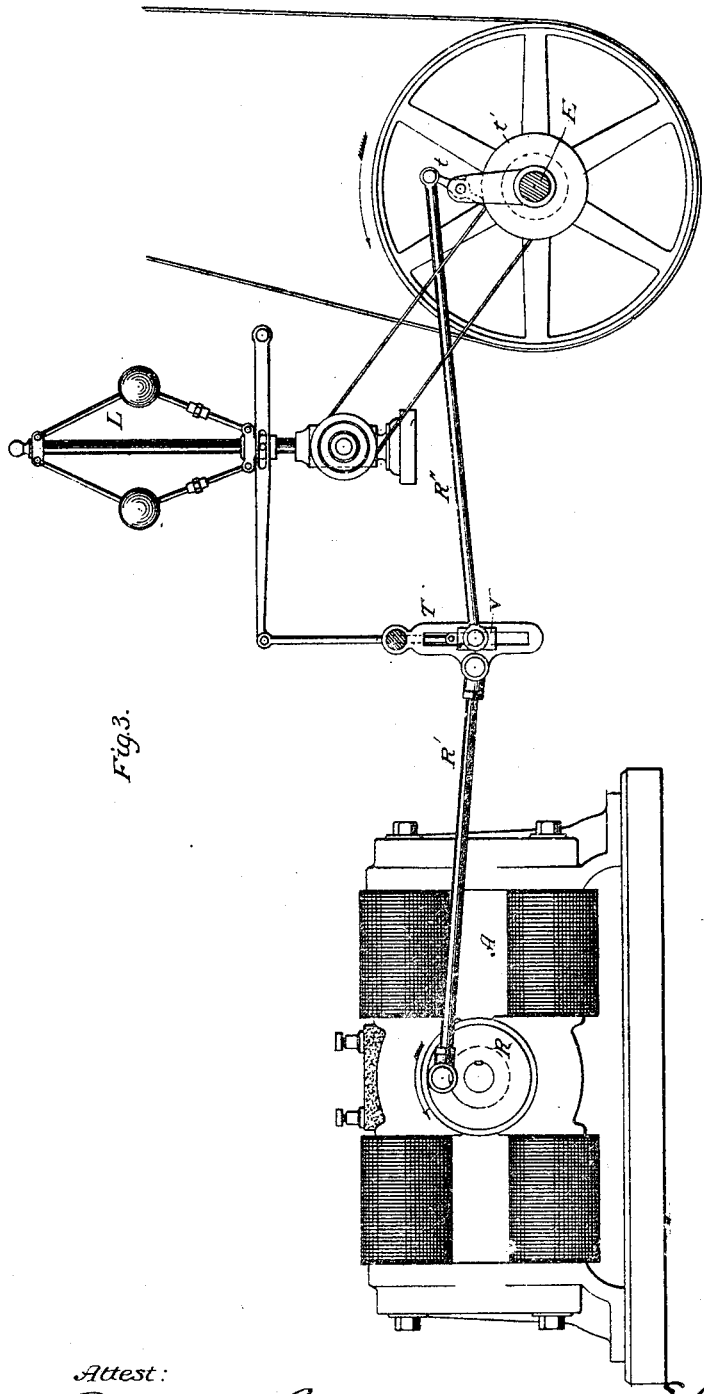

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DEVICE FOR REGULATING THE ELECTRICAL TRANSMISSION OF POWER.

SPECIFICATION forming part of Letters Patent No. 272,364, dated February 13, 1883.

Application filed October 24, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Devices for Regulating the Electrical Transmission of Power, of which the following is a specification, reference being had to the drawings accompanying and forming a part of the same.

In the electrical transmission of power by means of electromotors in circuit with one or more generators which supply the current for operating them, the speed of the electromotor varies with variations in its load or the amount of work which it is called upon to do. If, for example, the electromotor is employed to drive a line-shaft from which several machines are driven, whenever one or more of the machines driven by the line-shaft are disconnected therefrom the load upon the electromotor is diminished, and its speed of rotation tends to correspondingly increase. An increase in the speed of rotation of the motor involves, of course, a like increase in the speed of rotation of the line-shaft which the motor drives. It has been heretofore sought to automatically prevent this increase in speed of rotation by governing the speed of the motor, this being usually attempted by the introduction of resistance or its equivalent into the main or field circuit of the generator supplying the current for driving the motor whenever the motor is relieved from portions of its load. It has also been proposed to automatically open the circuit whenever the speed of the motor rises or falls to a predetermined point; but inasmuch as both of these expedients involve the employment of electrical appliances more or less expensive and intricate in proportion to their efficiency, they are open to many objections and difficulties. When an electro-magnetic motor is included in the circuit with a dynamo-electric generator it develops in the circuit an electro-motive force opposed to that of the generator. Assuming, by way of illustration, that the generator and motor are of the same character and capacity, and disregarding entirely the retarding effects of friction, the resistance of the conductors connecting the two machines, and also the internal resistance of the machines themselves, it is evident that so long as the electro-motive force of the generator preponderates over the counter electro-motive force of the motor, an amount of current energy represented by the difference of the two electro-motive forces will be transformed into the work of revolving the armature of the motor. The speed of the driven machine or motor will in consequence be increased, the tendency being toward the attainment of that rate of speed necessary to make its electro-motive force equal to that of the generator. If the motor is now made to do some work—as, for example, to drive another machine—its speed of rotation, and consequently its counter electro-motive force, fall, and there is an increase in the amount of current energy manifested, which increases in proportion to the amount of the added work. As a matter of fact, the disturbing elements of friction and resistance affect to a greater or less extent this law of operation, without, however, changing materially the general result; and it is evident from the above that the motor, if permitted to vary its speed of rotation according to the amount of work put upon it, is capable of automatically governing the amount of current flowing, or, more properly speaking, the amount of current energy transformed into work. By my invention this capacity of the motor is made use of as the means of automatically governing the amount of current energy transformed or expended, and I effect this result by operating on the motion-transmitting devices that connect the motor with the machine or shaft driven, thereby varying the action or effect of said devices in such manner as to maintain the speed of the driven machine constant, while permitting the motor to revolve at a varying speed that is determined by its load.

In the practical application of my invention I combine with the motion-transmitting devices regulating mechanism, the action of which is made to depend directly or indirectly upon the speed of the motor, and the functions of which are to bring about automatically a uniform rate of speed in the driven machine or shaft, while permitting that of the motor to vary.

The motion-transmitting devices may be greatly varied. The mechanism combined with and acting upon them may, however, be classified under three general heads, the first comprising all such as are purely mechanical, the second those that are purely electrical, and the third those that involve both mechanical and electrical appliances, the action of the former being dependent upon or controlled by that of the latter, or conversely. In principle of operation the devices comprised under these heads are similar. They will, however, be made the subject of separate applications for Letters Patent, the present application being directed more particularly to those falling under the first head.

In the drawings, Figure 1 is a diagram illustrating one form of regulator. In said figure, A designates an electro-magnetic motor; B B, the conductors of the circuit with which the same is connected. C is the motor-shaft; D, a cone-pulley fixed thereto. E is any shaft to be driven by the motor; F, a cone-pulley fixed thereto; and G is a belt that runs over the two pulleys D and F, transmitting the motion of the motor A to shaft E. A centrifugal governor of any proper kind is geared to the shaft E. In the present instance the balls $d\ d$ of this governor are drawn together by a spring, S, and thrown outward by centrifugal action. The arms $a\ a$ are connected to and shift a sleeve, $b$, on the spindle $c$. A belt-shifter, $e$, by means of a collar, $f$, is connected with the sleeve $b$. The operation of these devices is as follows: When by reason of an increase in the load imposed upon shaft E its speed, as well as that of the motor, is decreased, the governor-balls are drawn inward by the spring S and the belt shifted over to the larger end of the motor-pulley. As a result the relative rates of speed of the motor and driven shafts are altered, so that while the motor is now running slower the shaft E is driven at its former or normal rate of speed. Conversely, when by reason of a decrease in the load the speed of the system is increased the spreading of the governor-balls operates to draw the belt over toward the smaller end of the motor-pulley, by this means preserving the normal rate of speed of shaft E, although the motor is running much faster. By this means the system is rendered a self-regulating one, the motor being permitted to run slower or faster, according to the work to be done, while the speed of the shaft driven by it is not materially changed.

In Fig. 2, which represents a modified form of regulating or shifting mechanism, the motor A, its pulley D, the shaft E, pulley F, and belt G are the same as in Fig. 1. A centrifugal governor, L, of the ordinary kind, is also geared with the shaft E. The belt-shifter consists of a slide, K, arranged to be moved in opposite directions by the revolution of a screw-shaft, M, carrying a friction-disk, $m$. In a frame, N, pivoted near one end, as at $p$, are journaled two shafts, $n\ n'$. One of them, as $n$, is in gear with a cog-wheel, $o$, on a spindle, $o'$, connected by a belt, $p'$, with the shaft E. The motion of shaft E is transmitted to shaft $n'$ by a belt, $r$, the object being to impart to both shafts a rotation in the same direction. Other means than this may be used—for example, the cog-wheel $o$—and spindle $o'$ may be dispensed with and both shafts $n\ n'$ driven by belts from shaft E. On the ends of shafts $n\ n'$ are fixed friction-wheels $x\ x'$. The frame N is connected by a rod, $v$, with the lever $v'$ of the governor. Any increase in the speed of the shaft E throws out the governor-balls and depresses the rod $v$, by which the friction-wheel $x$ is brought into contact with the disk $m$. The connections are so arranged that the disk will, by the movement thus imparted to it, cause the belt G to be shifted toward the smaller end of the motor-pulley, and for a decrease in the speed of the shaft E the disk $m$ will be turned in an opposite direction by the wheel $x'$ and the belt G brought over to the larger end of the motor-pulley. By thus using the governor simply to bring into operation mechanism for shifting the belt, whatever the character of this mechanism may be, a great advantage is gained, inasmuch as a very slight range of movement of the governor is all that is required.

In Fig. 3 is shown a modified form of motion-transmitting device. In this case the driven shaft E is rotated by means of a friction-pawl, $t$, operating on a disk, $t'$, fixed to the shaft. The pawl $t$ is oscillated by the motor A, the rotary motion of the latter being converted into reciprocating for this purpose by a crank-wheel, R, and transmitted by rod R' to a swinging bar, T. A second rod, R'', is pivoted to the friction-pawl $t$, and to a slide, V, arranged to move vertically in a slot in bar T. A centrifugal governor, L, is driven by shaft E, and a lever operated by the governor is connected with the slide V. An increase in speed of the shaft E would cause the governor to raise the slide V; but by this means the length of stroke of rod R'' and pawl $t$ is reduced. In this way the speed of the motor may undergo very marked variations without permanently affecting that of the shaft E.

I have now described the most efficient mechanical means of carrying out my invention. That these may be greatly varied in many respects will appear from the foregoing. I do not therefore confine myself to the specific devices herein described.

I would state that many details of mechanism are herein shown and described, but not specifically claimed, the right to such being reserved for other applications.

What I claim as new and of my invention is—

1. In a system of electrical transmission of power, the combination, with the electric motor and the driven shaft or machine, of motion-transmitting devices and mechanism for automatically varying the action or effect of the same, whereby the speed of the driven machine is maintained uniform, while that of the motor is permitted to vary, substantially as and for the purpose set forth.

2. In a system of electrical transmission of power, the combination, with an electric motor and a driven shaft or machine, of motion-transmitting devices connecting the motor with the machine, a centrifugal governor, and intermediate connections adapted to vary the action or effect of the motion-transmitting devices, substantially in the manner herein set forth.

3. In a system of electrical transmission of power, the combination, with an electric motor and a driven shaft or machine, of a motion-transmitting device consisting of a belt and cone-pulleys, an automatic belt-shifter, and a centrifugal governor for controlling the same, all substantially as herein set forth.

In testimony whereof I have hereunto set my hand this 21st day of October, 1882.

EDWARD WESTON.

Witnesses:
HENRY A. BECKMEYER,
PARKER W. PAGE.